June 7, 1966  J. F. TERENZI  3,255,142
PROCESS FOR THE SEGMENTATION OF POLYMER GELL
Original Filed Sept. 28, 1960  2 Sheets-Sheet 1

INVENTOR.
JOSEPH F. TERENZI
BY Frank M. Vaught
ATTORNEY

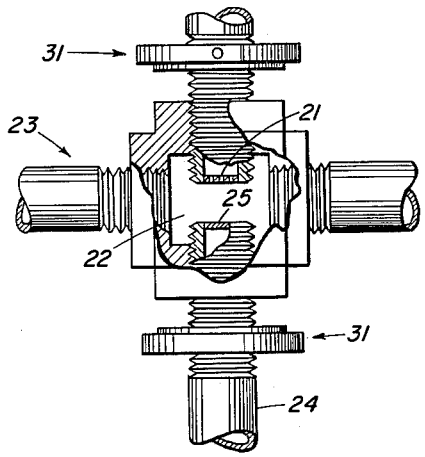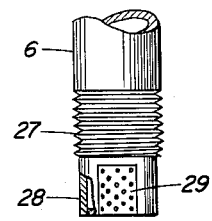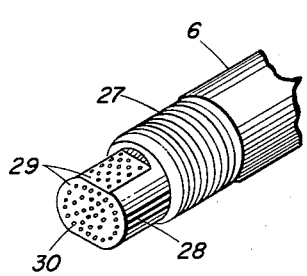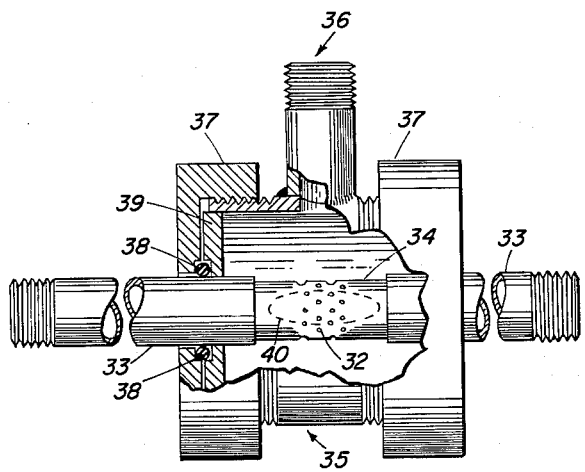

3,255,142
PROCESS FOR THE SEGMENTATION OF POLYMER GELL

Joseph F. Terenzi, South Norwalk, Conn., assignor to American Cyanamid Company, New York, N.Y., a corporation of Maine
Original application Sept. 28, 1960, Ser. No. 58,926, now Patent No. 3,208,829, dated Sept. 28, 1965. Divided and this application Nov. 7, 1963, Ser. No. 322,225
3 Claims. (Cl. 260—29.6)

The present application is a division of 58,926 filed September 28, 1960 which is in turn a continuation-in-part of application Serial No. 737,759, filed May 26, 1958, now abandoned.

The above-mentioned application Serial No. 737,759 relates to a method of extruding highly viscous or gel-like polymer solutions into the path of a non-solvent in order to subdivide the viscous solution and thereafter precipitate the free polymer from the solution. The technique avoids degradation of the polymer molecule. Such degradation is detrimental and makes it practically impossible to control the uniformity of the molecular weight whereas through the employment of this process little or no degradation occurs, and excellent uniformity and ease of handling are obtained.

This invention relates to novel pieces of apparatus useful in an extrusion system for the purpose of diluting exceedingly viscous solutions of water-soluble polymeric materials and to the process of diluting said viscous polymeric solutions. More particularly, this invention relates to specifically designed nozzle-extrusion arrangements which are useful in carrying out the process of the present invention. This invention further relates to the use of a solvent for the polymer solution so that these extremely highly viscous or gel-like polymer solutions may be further diluted into a free flowing liquid without degradation of the polymer molecule.

It is an object of the present invention to provide a novel method of preparing a free flowing polymer solution from a highly viscous or gel-like solution of the polymer. Another object is to provide a continuous method of diluting highly viscous aqueous polymeric solutions by injecting the polymer solution essentially perpendicularly into a turbulent stream of solvent for the polymer. A further object resides in the provision of a free flowing solution of a product which is substantially pure and unimpaired in molecular weight. A still further object is to provide novel nozzle arrangements which are particularly adaptable to the above-mentioned method. These and other objects of the present invention will be discussed in greater detail hereinbelow.

This invention in essence comprises two basic features or aspects: (1) wherein a viscous polymeric solution is extruded and sheared into segments, producing particles of greatly increased surface area and (2) the diffusion of the solvent into the polymeric particles, thereby diluting the viscous polymer solution. The procedure of the invention thus comprises feeding a viscous polymer solution under pressure through a suitable injecting apparatus, such as an extruding nozzle, directly into a moving stream of liquid solvent for the polymer. Preferably the injecting device is located within the moving stream and within the area of maximum stream turbulence, to obtain the advantages of the greatest shearing force of the stream, and is directed so as to inject the polymer at substantially right angles to the moving stream.

In principle, the turbulent solvent stream passing the extruding nozzle locality must develop sufficient total drag force on the extruded "cylinders" of polymer solution to shear them off to form particulate segments or fragments. The size of the sheared polymer segments may be altered by varying the extrusion rate or by varying the velocity of the turbulent solvent stream, or by an adjustment of both of these variables. Generally, the adjustment producing a segment size of below about 2 inches in length should be employed, inasmuch as some handling difficulty may be encountered with longer segments. Preferably, segment sizes of below 1 inch and between ⅛ and ¾ inch in length are desirable for most purposes and afford a very suitable area as well as product size.

The process of the present invention will be further described by reference to the figures of the drawings wherein:

FIG. 3 is an illustration of a novel extrusion arrangement having an adjustment for the rate of flow past the nozzle.

FIG. 4 is an optional form of a nozzle which may be used with the extrusion arrangement of FIG. 3.

FIG. 5 is an isometric view of the nozzle of FIG. 4.

FIG. 6 is an alternate mode of extrusion arrangement where the extrusion apertures are in the pipe itself.

Figure 1:
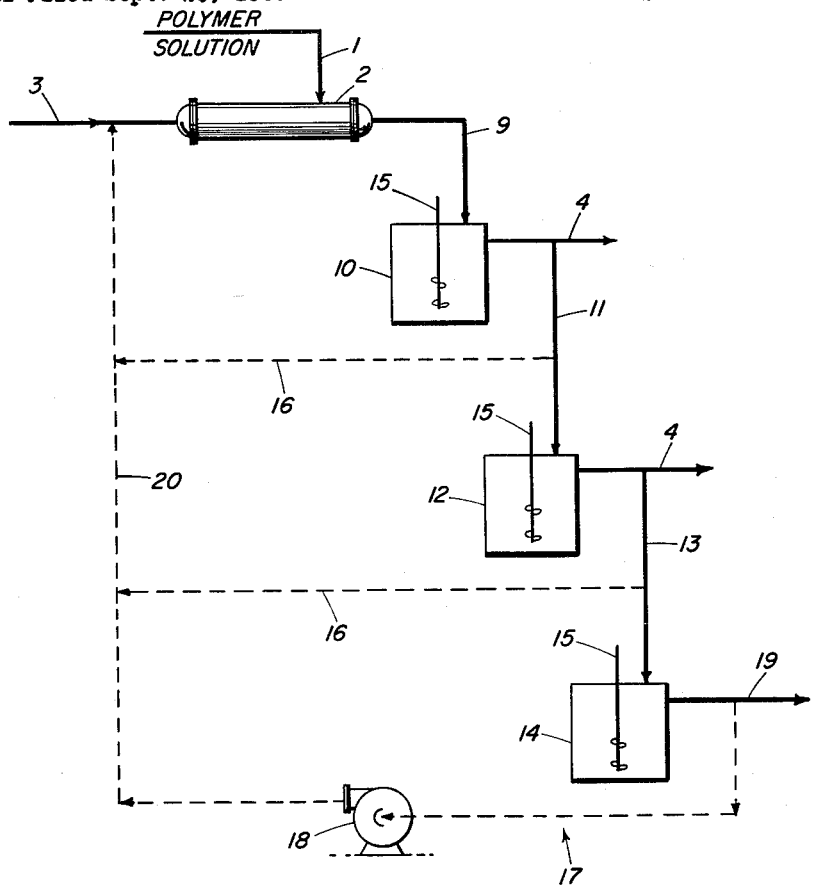
FIG. 1 shows schematically an assembly for carrying out the dilution procedure of the instant invention.

The process, by reference to the drawing, will be described in detail in connection with the extrusion and further dissolution of polyacrylamide from a highly viscous or gel-like solution thereof in water, but it will be apparent, as hereinafter provided in the specifications and claims and by way of examples, that other polymeric materials in solution may be employed utilizing suitable solvents and various liquid solvents, in addition to water as a diluting media.

By reference to FIG. 1 of the drawing, a description of the invention will be facilitated. As shown therein, a viscous polymer is introduced through the feed line 1 into extrusion unit 2, wherein, as more clearly shown by reference to FIGS. 2 through 6, the polymer solution is fed under pressure through one or more of the novel extruding nozzles, into a turbulent solvent stream. These nozzles are securely situated in a cross-arrangement so as to extend into the path of flow of solvent which is fed through line 3.

Figure 2:
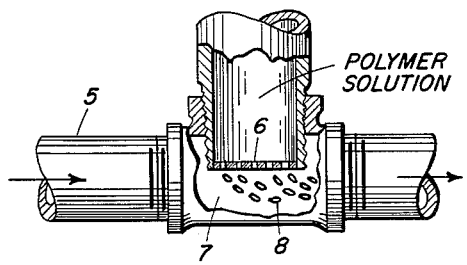
FIG. 2 shows, diagrammatically, an injection arrangement illustrating an extrusion nozzle extruding polymer solution at a point located substantially in the center of the path of a moving stream of solvent.

In FIG. 2, the extrusion head 6 is located near the center 7 of the moving stream of solvent in pipe 5 so that the force from the maximum velocity will be utilized to shear the material extruded from the extrusion head 6 into fragments 8.

The production of particles or small cylinders having a predetermined particle size may also be obtained by adjusting the linear velocity of the turbulent stream passing the apertures in the nozzles. The particle sizes obtained with various viscous polymer solutions is, in accordance with empirical relationships, for example, those involving total drag forces, drag coefficients, the diameter of the holes in the nozzle, and the viscosity or shear strength of the polymer solution.

The fragmented polymer is carried in the moving stream of solvent in the pipe line 9 for a distance which may be sufficient to fully dissolve the polymer in transit, although as shown it is preferred that the particles be introduced into a series of holding tanks 10, 12 and 14 through lines 9 and 11 and 13, respectively. Each of the tanks is preferably equipped with a conventional stirrer 15 to enhance diffusion of the solvent into the particles and accelerate dilution of the polymer into a free flowing liquid. The liquid solution is withdrawn from tank 14, to storage through pipe 19 or may be recirculated, if necessary, through conduit 17 and pump 18, and conduit 20. Although holding tanks 10, 12 and 14 are employed as described, it will be apparent that a single tank may suffice, depending on material processed, capacity of tank, retention time, etc., or that a simple pipe line providing sufficient residence time may be utilized. The diluted polymer solution withdrawn at 19 from the tank 14 may be further diluted in a reservoir (not shown). The system may be run batchwise to obtain a different range of dilutions, i.e. streams 1 and 3 may be shut off at any predetermined time and the system recirculated from any point back through line 18 until dissolution is complete. Then product is withdrawn from all of the stages. Lines 16 are provided for recirculation where holding tanks 12 and/or 14 may be short-circuited, and the solution drawn off at either of the outlets 4.

The process of the present invention may be advantageously carried out by employing the novel extrusion systems as shown by FIG. 3 or FIG. 6. Those systems are particularly adaptable to the invention set out in application, Serial No. 737,759, now abandoned, and the present invention in that they provide for adjustment of the rate of flow of the solvent. They also provide a convenient arrangement for removal and cleaning.

FIG. 3 shows an extrusion nozzle 21 extending into cross 22 which is inserted into the pipe line 23 so that nozzle 21 may extend into the path of the solvent. Restriction adjusting means 24 may be a solid threaded rod or a threaded pipe with a blank-off plate welded to its terminal end 25. By adjusting the distances which the extrusion nozzle and the restriction adjusting means extend into the path of impinging fluid, the velocity of the fluid may be controlled thereby providing a convenient means of controlling the size of the extruded particle.

FIGS. 4 and 5 show an extrusion head 6 (as in FIG. 2) in greater detail which provides a maximum surface area for extrusion. Extending longitudinally past the threaded portion 27 is a machined area 28 with planed surfaces 29 which are parallel to each other and to the axis of the extrusion nozzle. These planed surfaces contain apertures in addition to those in the terminating extrusion head 30. The apertures which have an optimum diameter of about $\frac{1}{2}''$ to $\frac{1}{8}''$ are preferably placed in a staggered relationship so that contact between the extruded particles is minimized. The apertures may be as small as $\frac{1}{64}''$ in diameter and still be operative. In order to obtain the most efficient effect from the impinging liquid, it is desirable that the planed side portions are parallel to the velocity direction. The nozzle in FIG. 4 may be substituted for nozzle 21 in FIG. 3 by screwing the threaded portion into the proper female fitting of cross 22 until the extrusion head extends into the path of the solvent stream. Both the exrusion nozzle and the restriction adjusting means 24 are then locked in place by lock nuts 31.

FIG. 6 is an illustration of another form of extrusion system which may be advantageously employed in carrying out the invention. In this alternate mode, the extrusion nozzle is eliminated and a staggered array of extrusion apertures 32 defining an area surrounding a longitudinally extending portion of pipe 33 thereby providing an extrusion zone. This array of apertures may conveniently be a separate nipple 34 extending as a male fitting into the divided sections of pipe 33 whereby a continuous path is provided for the solvent or other processing fluid. In coaxial alignment with pipe 33 and providing a longitudinally extending cylindrical chamber surrounding the said apertures is manifold 35. Extending radially from the periphery of the manifold 35 is polymer inlet pipe 36. Threadably mounted at each end of the manifold 35 is cap 37 which acts to force O-ring 38 against end plate 39 whereby a seal is effected between end plate 39 and pipe 33.

During operation of this extrusion device, the highly viscous, gel-like polymer solution is discharged into pipe 36 where it enters manifold 35. As the solution fills the chamber, it surrounds nipple 34 and is intruded through the staggered array of apertures 32 into the path of the solvent which has a predetermined kinetic energy. The drag force of the solvent shears the extruded segments which have attained sufficient length. It is desirable that the array of apertures be staggered so that there is a minimum of contact between the intruded segments and that the intrusion zone contain the maximum number of apertures.

In order to adjust the flow rate of the impinging solvent past the extrusion apertures without affecting the overall system, a torpedo element 40 may be inserted in the flow path. The torpedo element 40 should have a substantial length of constant cross section which is equal to or longer than the length of the intrusion zone. The torpedo element 40 is so placed that the segment of constant cross section transverses the entire intrusion zone. The torpedo element may be supported by a radially extending arm (not shown) which is attached to the inner wall of the solvent pipe 33 or nipple 34 or a long rod extending axially from the torpedo element which is fixedly attached to the inner wall of an elbow or bend in the pipe 33 downstream from the torpedo element.

The particular intrusion system shown in FIG. 6 is particularly desirable in that the intrusion zone may be varied in its length and also provides a system which is less likely to clog since there is nothing protruding into the solvent path. Moreover, the actual intrusion area is very easily cleaned should clogging occur or if the polymer itself is changed.

The inventive concept herein described is applicable to a wide range of polymeric materials, including homopolymers and copolymers, where it is desired to obtain a free-flowing solution of the material from a highly viscous semi-solid solution of the polymer. Among the polymers which may be treated in accordance with the process of the present invention are polymers and copolymers of acrylamide, methacrylamide, acrylic acid and salts thereof, such as sodium acrylate, potassium acrylate, lithium acrylate, ammonium acrylate, and the like; polymers containing vinyl alcohol, vinyl sulphonate units and salts thereof and the like; styrene, ring-substituted alkyl styrenes, such as orthomethyl styrene, metamethyl styrene, paramethyl styrene, 2,4-dimethyl styrene, 2,5-dimethyl styrene, 3,4-dimethyl styrene, or the higher monoalkyl or polyalkyl ring-substituted styrenes including the ethyl, propyl, butyl and the like; ring-substituted halostyrenes, such as ortho, meta, or para chlorostyrene, 2,4-dichlorostyrene, 2,5-dichlorostyrene and the like; the nitriles such as acrylonitrile, methacrylonitrile, ethacrylonitrile, alphachloroacrylonitrile and the like; the esters of acrylic acids such as methyl acrylate, ethyl acrylate, butyl acrylate, methyl methacrylate, ethyl methacrylate, and the like.

The process of the present invention is applicable to solutions of polymers and includes solutions of water-soluble polymers, as well as organic and inorganic solvent soluble polymers, as well as mixtures thereof. The invention is applicable to polymers having a molecular weight varying over a fairly wide range. For instance, the process may be applied with polymers having almost any molecular weight including those between about 50,000 and in excess of 5,000,000 wherein the molecular weight of the higher polymers is a weight average molecular weight.

The concentration of the polymer in the aqueous solution from which the polymer is applied may vary over a fairly wide range, depending upon the concentration of the monomer in solution as prepared. This range may vary between about 3% by weight in the case of polyacrylamide, for example, and 80% by weight in the case of less gel-like polymer solution, for example, based on the total weight of solution. For the most practical purposes, this inventive concept will be applicable to polymeric solutions having a concentration between about 5 and 70% by weight of solution. Of course, the initial concentration of the solution to a certain extent governs the range of concentration obtainable. For example, it is quite impractical to dilute a certain concentration to a concentration which is only one or two percent less than the original concentration. As seen from the drawing and the description thereof, it is possible to increase the concentration range through multiple recirculation; this provides for a continual build-up of dissolved polymers in solvent whereby maximum concentrations are obtained. In a strictly continuous process the concentration is rigidly governed by the rate at which the polymer solution is added to the impinging solvent and does not have the advantage of the batch process wherein a predetermined amount of solvent is employed. A definite weight of polymer solution may then be extruded into this solvent and recirculated therewith until complete dissolution is obtained. The batch procedure is still limited in that a minimal amount of solvent is necessary for operation of the equipment. Since the amount of solvent required decreases as the desired change in concentration decreases, the desired change must be sufficiently large in order to use enough solvent to carry out the procedure. For example, if a 10% polyacrylamide solution is to be diluted to a 9% solution the value of the solvent will be only about 1/10 of the polyacrylamide solution itself.

Any of the various known solvents for the polymer being treated may be employed in forming the solutions which are treated according to the invention procedure. It will be apparent that compounds which are suitable as precipitating agents for some polymers may, for different polymers, serve as the diluting agent in the process. These diluting agents are characterized by the fact that they are at least partially soluble in the solvent for the polymer, are inert to said polymeric material inasmuch as it does not enter into any reaction with said polymeric material nor alter its chemical properties in any way. The diluting agent must also be of such a character that the polymeric material is substantially soluble therein. The diluting agent may be miscible with the polymer solvent or only partially soluble therein.

In the case of polyacrylamide, water which may serve as the polymerization media is the preferred diluting agent.

The procedure of this invention is employed with particular advantage in diluting extremely viscous or gel-like solutions which have heretofore been difficult and oftentimes impossible to process without degradation of the polymer molecule. Solutions such as solutions of polyacrylamide, polymethylstyrene and methylstyreneacrylonitrile copolymers are exemplary.

In order that the concept of the present invention may be more completely understood, the following examples are set forth in which all parts and percentages are by weight unless otherwise indicated. These examples are set forth primarily for purpose of illustration and any specific enumeration of detail contained therein should not be interpreted as a limitation on the inventive concept, except as is indicated in the appended claims. These examples are carried out at room temperature unless otherwise indicated.

*Example 1*

The polymer feed consists of a solution of polyacrylamide in water. The solution may be prepared via a direct batch solution polymerization, according to the typical procedure given below.

41 parts of a commercial acrylamide is added to 458 parts of deionized water and the resulting solution is brought to 50° C.±3° C. At this point, 0.0193 part of potassium persulfate and 0.00165 part of potassium meta bisulfite, each dissolved in about 5 parts of water, are added and the pH is adjusted to about 3.0 by adding 0.324 part of phosphoric acid. There is an induction period of about 30 minutes which is followed by rapid adiabatic polymerization. The temperature approaches 75° C. after 2 hours, and after 5-10 hours, the polymerization is essentially complete. The resulting viscous solution has a solids content of approximately 8.0% and a viscosity of about the range $2 \times 10^6$ cps. (Brookfield Viscometer, Model RVF, 2 r.p.m.). This material is then pumped to an extrusion nozzle, such as that described by reference to the drawing. An extrusion rate of 4.1 lbs. per minute is used and a water rate of 40 g.p.m. or 15.9 feet per second, passes the nozzle. Cylindrical segments of particles about ½″ to ¾″ in length and about 1/16″ in diameter are produced. The viscous polyacrylamide solution is diluted by the action of the continuous water solvent phase. The diffusional process of diluting the viscous polymer takes about 3 hours and this is accomplished by this retention time in tanks such as those shown as 10, 12 and 14 in the accompanying flow sheet. A free flowing diluted polymer solution having about 0.1 pound polymer per 100 pounds solvent is continuously withdrawn at 19.

*Example 2*

Ingredients same as Example 1. Tank 10 is filled with 3950 parts water which is circulated back through line 16 at a 40 g.p.m. Fifty parts of polymer solution are fed through line 1 over a period of 10 to 15 minutes. Recirculation through line 16 and agitation in tank 10 is continued for about 3 hours. Diluted polymer solution containing 0.1 part polymer to 100 parts solvent is withdrawn from tank 10.

*Example 3*

Same as 2 except tank 10 is filled with 1950 parts water. The final diluted polymer solution contains 0.2 part polymer to 100 parts solvent.

*Example 4*

Same as 2 except tank 10 is filled with 800 parts water. The final diluted polymer solution contains 0.5 part polymer per 100 parts solvent.

*Example 5*

The polymer diluted here is a copolymer of acrylamide and acrylic acid (85:15 mole ratio). The feed consists of a water solution of this copolymer having a solids content of about 27% and a monomer content of about 1.2%. The solvent flow rates are equal to those in Example 1. Ten parts per minute of polymer solution are fed through line 1. 40 g.p.m. water is fed through line 3. Polymer solutions having 0.79 part polymer per 100 parts solvent are continuously withdrawn from tank 14.

*Example 6*

Same ingredients as Example 5. Circulate 400 parts water, feed 100 parts polymer solution. End up with polymer solution containing about 5 parts polymer per 100 parts solvent.

*Example 7*

A viscous solution of polymethacrylamide (viscosity about $1.8 \times 10^6$ cps.) is prepared by polymerizing 48 parts of methacrylamide in 470 parts of deionized water in the presence of 0.02 part of potassium persulfate and 0.33 part of potassium metabisulfite at a pH of 3.5 and an initial temperature of 55° C. of 1.5 hours followed by adiabatic polymerization for 7 hours when polymerization is substantially complete. The viscous polymeric solution is pumped into an extrusion nozzle of the type described in FIG. 2 of the drawing and extruded at a rate of 4.1 lbs. per minute into a turbulent stream of water moving with a velocity of 15.9 feet per second at the extruding nozzle. Particles of approximately ¼ inch in length and about ⅛ inch in diameter are produced which substantially dissolve in the aqueous solution without a detectable change in molecular weight.

Example 8

The procedure of Example 1 is substantially repeated with the exception that the potassium persulfate-potassium bisulfite is introduced in 2 equal increments, the second increment after polymerization has proceeded for 2 hours. The adiabatic polymerization period is 10 hours. The viscosity of the polymeric solution is $3.2 \times 10^6$ cps. The solvent is water having a velocity at the extruding nozzle of 20 feet per second. The extrusion rate is 4.0 lb. per minute. The particles extruded are about ¼ to ½ inch in size which substantially dissolve in the aqueos solution without a detectable change in molecular weight.

I claim:

1. A method of forming a free-flowing solution from a highly viscous, gell-like polymer solution which comprises extruding said viscous solution as 1/64 to ½ inch diameter extrudates into a transversely flowing stream of liquid solvent for said polymer, said solvent stream having a flow velocity sufficient to sever said extrudates into segments about ⅛ to 2 inches long and diluting said segments of polymer to form a free-flowing solution.

2. A method of forming a free-flowing solution of a high viscous, gell-like polyacrylamide solution which comprises extruding said viscous solution as 1/64 to ½ inch diameter extrudates into a transversely flowing stream of a liquid solvent for said polyacrylamide, said solvent stream having a flow velocity sufficient to sever said extrudates into segments about ⅛ to 2 inches long and diluting said segments of polyacrylamide to form a free-flowing solution.

3. A method of forming a free-flowing solution of a highly viscous, gell-like acrylamide copolymer solution which comprises extruding said viscous solution as 1/64 to ½ inch diameter extrudates into a transversely flowing stream of a liquid solvent for said copolymer, said solvent stream having a flow velocity sufficient to sever said extrudates into segments ⅛ inch to 2 inches long and diluting said segments of copolymer to form a free-flowing solution.

References Cited by the Examiner

UNITED STATES PATENTS 3,053,819  9/1962  Carlin _____ 260—89.7

MURRAY TILLMAN, *Primary Examiner*

P. LIEBERMAN, *Assistant Examiner.*